June 2, 1959   J. E. GOLDRING ET AL   2,889,150
COLLET CHUCK
Filed June 12, 1958

JOHN E. GOLDRING
ARTHUR E. KREMILLER
INVENTORS.

BY Hazard & Miller
ATTORNEYS

United States Patent Office 2,889,150
Patented June 2, 1959

2,889,150

COLLET CHUCK

John E. Goldring and Arthur E. Kremiller, San Leandro, Calif., assignors to Modernair Corporation, San Leandro, Calif., a corporation of California Application June 12, 1958, Serial No. 741,520

1 Claim. (Cl. 279—4)

This invention relates to a collet chuck.

They are particularly useful in the course of various types of machining operations where a succession of duplicate articles is to be operated upon and wherein it is desirable that the articles successively placed in the collet are frequently located in identical positions.

It is customary to provide a collet chuck which will receive a collet, the latter moving axially into and partially out of the chuck to alternately constrict and expand its jaws to secure and release the work.

The present chuck is one which has as one object the provision of a collet closer which moves relative to the collet and wherein the latter is held stationary by a fixed connection with the body of the structure. By reason of this the collet itself does not move axially but only constricts and expands radially. The advantage of this is that the fixed positioning of the collet insures more accurate positioning of the work relative to a drill press or other machine which is used to operate upon the work.

Another object of the invention is to provide means, in a fluid actuated collet chuck, for preventing the piston in the chuck from rotating so that in turn the collet closure will not rotate when high torque loads are applied to the work piece in the collet.

The above and other objects will more fully appear from the following description in connection with the accompanying drawing.

Figure 1:
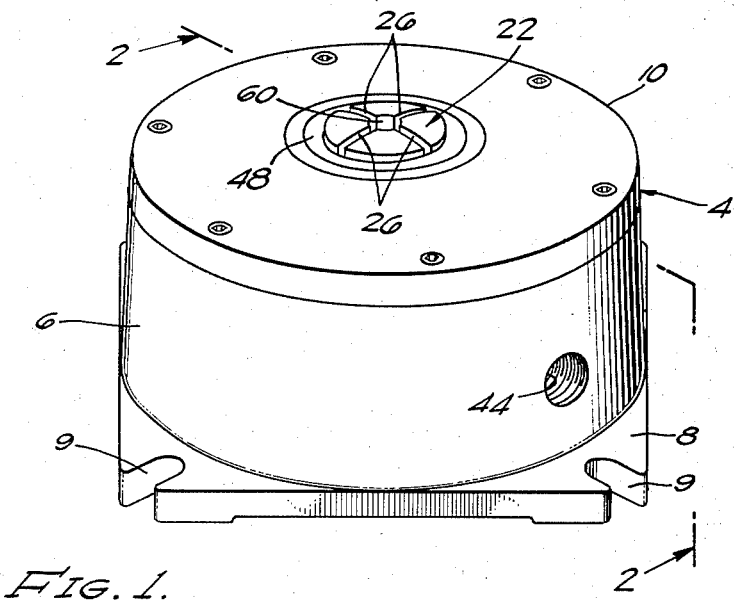
Fig. 1 is a perspective view of an embodiment of the invention.

The structure illustrated includes a body 4 having a side wall 6 and a generally square bottom flange 8 having stud-receiving notches 9 at its corners and by means of which the body can be suitably secured to a bench. The body has an upper removable end plate 10 for assembly and access to the interior for repair and maintenance. The bottom of the body is defined by a wall 12 which preferably is raised above the bottom flange 8.

The chuck is provided with a central bore 14 defined by a sleeve 16 which may be formed integrally with the bottom wall 12 of the body.

The lower end of the sleeve 16 has threaded into it a collar 18 and into this is threaded the bottom 20 of a conventional type of collet 22. The upper portion of the collet is flared outwardly, as at 24, and provided with the usual vertical slots 26 so that said collet can be constricted and expanded.

The upper interior portion of the body side wall 6 defines the outer wall 28 of an annular cylinder 30. The inner wall 32 is formed on the upper outer portion of the central axial sleeve 16.

Movable in the cylinder 30 is an annular piston 34 whose outer edge is channeled to receive an O-ring seal 36. The inner side face of the piston 34 is sealed by an O-ring 38 in a channel about the upper portion of the sleeve 16. One or more bosses 40 extend outwardly from the annular piston 34 and upon it is a spring 42 whose upper end bears against the underside of the top plate 10, thereby biasing the annular piston in a downward direction. One or more pins 43 extend upwardly from the piston 34 and have their upper ends slidably received in an equal number of sockets 45 in the under side of the end plate 10. These pins 45 keep the piston 34 from rotating, thereby locking the collet closer 48 from rotating when high torque loads are applied to the work. The pressure fluid inlet 44 communicates with a chamber 46 beneath the annular piston 34 so that when pressure is applied said piston will be forced upwardly against the resistance of the springs 42 on the bosses 40.

A collet closure 48 has a portion thereof extending into a central opening 50 in the top plate 10 and the wall of said opening 50 is channeled to receive an O-ring seal 52 which is in contact with the side wall of the collet closure 48. Said collet closure has a bottom flange 54 which lies upon and is connected to the top of the annular piston 34 by means of studs 56.

Figure 2:
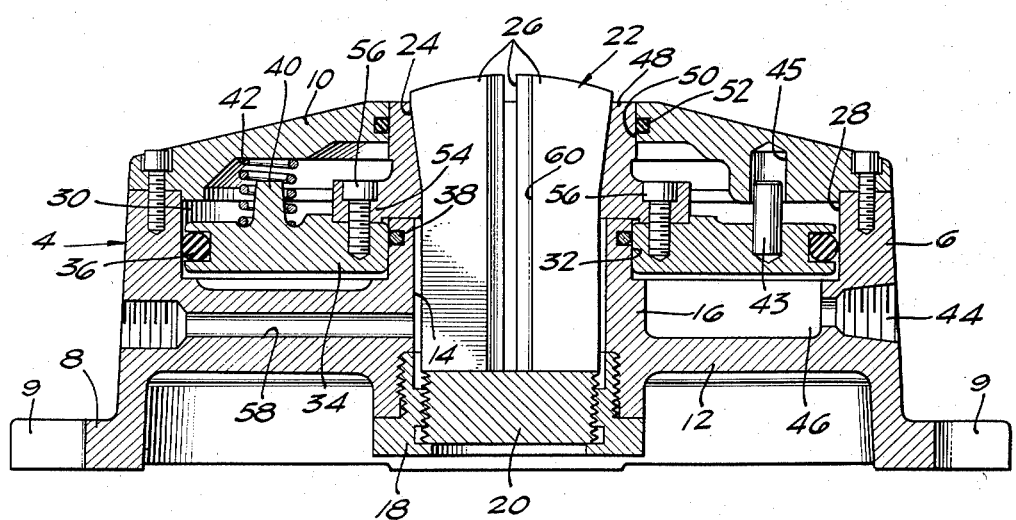
Fig. 2 is a slightly enlarged vertical sectional view taken approximately upon the line 2—2 of Fig. 1.

At the left side of Fig. 2 there is shown a conduit 58 which may be used to admit oil or other cooling liquid into the chuck and the collet to prevent overheating.

It will be seen that the collet 22 is connected rigidly to the bottom plate 12 of the body through the medium of the collar 18. Said collet is therefore incapable of axial movement during normal operation. When a piece of work is inserted in the central aperture 60 of the collet, pressure fluid admitted to the chamber 46 beneath the annular piston 34 will force the piston upwardly and the collet closure 48 will likewise move upwardly. This will cause the jaws of the collet 22 to be constricted and tightened against the work piece. Obviously when pressure fluid beneath the piston 34 is relieved, it will flow outwardly through the port 44 by reason of the spring-urged downward movement of the annular piston. This will draw the collet closure 48 downwardly in the body and permit the collet to expand and release the work piece.

Furthermore, it will be seen that the pins 43 (one only of which is shown although two are preferable) have their upper ends in the sockets 45 of the upper end pins 10. In a device of this kind, when a fairly large work piece in the collet 22 is subjected to considerable torque, the collet 22 might tend to rotate. However, in the chuck disclosed herein such rotation would be imparted to the piston 34 through the collet closure 48 and these parts would not rotate unless suitably held by the pins 43.

Also, the fact that the collet remains stationary insofar as axial direction is concerned, succeeding work pieces will more accurately be placed in the collet relative to vertical positioning and relative to a drill press or other machine which is to perform an operation on the piece of work.

It would be understood that various changes can be made in the form, details and arrangement of the structure without departing from the spirit of the invention.

We claim:

In a fluid actuated collet chuck, a body having an annular cylinder therein with concentric, radially spaced inner and outer circumferential walls, an annular piston axially movable in said cylinder, a collet closer connected to said annular piston for movement therewith and having an axially outer end, the collet closer extending above the outer end of the inner wall of said cylinder and having an axial bore with a counterbore at the outer end thereof, a collet having its axially outer portion located in the bore of said collet closer, said outer portion of said collet having a flared split axially outer end lying in said counterbore, the inner end of said collet being fixedly connected to said body adjacent the inner end of said radially inner cylinder wall, that portion of said collet between the inner end of said collet closer and the inner end of said collet being spaced from said inner cylinder wall, and said body having an inlet conduit adapted for connection with a source of coolant at one end thereof and at the other end thereof communicating with the space between said collet and said inner cylinder wall for the introduction of a coolant to said collet.

References Cited in the file of this patent

UNITED STATES PATENTS

| | | |
|---|---|---|
| 2,418,082 | Marasko | Mar. 25, 1947 |
| 2,477,773 | Soussloff et al. | Aug. 2, 1949 |
| 2,500,383 | Sadler et al. | Mar. 14, 1950 |
| 2,704,671 | Abramoska et al. | Mar. 22, 1955 |